United States Patent
Gil et al.

(10) Patent No.: US 8,308,918 B2
(45) Date of Patent: Nov. 13, 2012

(54) HYDROGEN GENERATOR

(75) Inventors: Jae Hyoung Gil, Seoul (KR); Chang Ryul Jung, Seoul (KR); Jae Hyuk Jang, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 1053 days.

(21) Appl. No.: 12/007,869

(22) Filed: Jan. 16, 2008

(65) Prior Publication Data

US 2008/0169188 A1 Jul. 17, 2008

(30) Foreign Application Priority Data

Jan. 16, 2007 (KR) .................. 10-2007-0004663

(51) Int. Cl.
  *C25B 9/00* (2006.01)
  *C25B 13/00* (2006.01)
(52) U.S. Cl. ........ 204/278; 204/193; 204/194; 204/242; 204/258
(58) Field of Classification Search .................. 204/278, 204/258, 193, 194, 242
See application file for complete search history.

(56) References Cited

U.S. PATENT DOCUMENTS

| | | | |
|---|---|---|---|
| 1,172,932 A * | 2/1916 | Bucknam | 204/258 |
| 6,890,410 B2 | 5/2005 | Sullivan | |

FOREIGN PATENT DOCUMENTS

| | | |
|---|---|---|
| EP | 1 464 728 A1 | 10/2004 |
| JP | 57-041386 | 3/1982 |
| JP | 63-175301 | 11/1988 |
| JP | 9-176884 | 7/1997 |
| JP | 2006-083428 | 3/2006 |

OTHER PUBLICATIONS

Japanese Office Action, with English Translation, issued in Japanese Patent Application No. 2008-006332, dated Aug. 3, 2010.

* cited by examiner

*Primary Examiner* — Harry D Wilkins, III
*Assistant Examiner* — Zulmariam Mendez
(74) *Attorney, Agent, or Firm* — McDermott Will & Emery LLP

(57) ABSTRACT

There is provided a hydrogen generator. The hydrogen generator including: an electrolytic bath having an inner space of a predetermined size; a cover hermetically covering an open top of the electrolytic bath and having at least one hydrogen outlet; a flexible pocket disposed in the electrolytic bath and filled with an electrolyte of a predetermined amount; an electrode part fixed to the cover, and immersed in the electrolyte filled in the flexible pocket to electrolyze the electrolyte upon application of power; and a power supply supplying current to the electrode part. In the hydrogen generator, the electrode part and the electrolyte maintains a substantially constant contact area there between, thereby allowing hydrogen to be generated constantly and stably.

8 Claims, 7 Drawing Sheets

HYDROGEN GENERATOR

CROSS-REFERENCE TO RELATED APPLICATIONS

This application claims the priority of Korean Patent Application No. 2007-04663 filed on Jan. 16, 2007, in the Korean Intellectual Property Office, the disclosure of which is incorporated herein by reference.

BACKGROUND OF THE INVENTION

1. Field of the Invention

The present invention relates to a hydrogen generator, more particularly, in which electrodes and an electrolyte maintain a substantially constant contact area therebetween, thereby obtaining hydrogen generated during electrolysis of the electrolyte stably per a predetermined time.

2. Description of the Related Art

Recent years have seen an increasing use of small-sized electronic devices such as mobile phones, personal digital assistants (PDAs), digital cameras and laptop computers. Particularly, with the start of digital multimedia broadcasting (DMB) for mobile phones, a small-sized mobile terminal is required to be improved in power capacity.

A lithium-ion secondary battery in current general use has a capacity enabling about two hours of DMB viewing and has been performing better. However, as a more fundamental solution, there has been a growing expectation for a micro fuel cell reduced in size and capable of providing high-capacity power.

In general, the micro fuel cell adopts hydrogen as the most appropriate fuel for realizing high performance. This has led to a need for a device for generating hydrogen supplied to the micro fuel cell.

There are two ways to produce this fuel cell. One is a direct methanol method in which a hydrocarbon fuel such as methanol is directly supplied to a fuel electrode. The other is a reformed hydrogen fuel cell (RHFC) method in which hydrogen is extracted from methanol to be injected to a fuel electrode.

The RHFC method utilizes hydrogen as a fuel in the same manner as a polymer electrode membrane (PEM) method. Thus, the RHFC has advantages of high-output, high power capacity attainable per unit volume, and no reactant present other than water. However, the RHFC method requires an additional reformer to be installed in a system, thus hindering miniaturization.

Also, the reformer includes a vaporizer vaporizing a hydrocarbon liquid fuel into a gas phase, a reforming unit converting methanol as a fuel into hydrogen through catalytic reaction at a temperature of 250□ to 350□, and a CO remover (or $CO_2$ remover) removing a CO gas (or $CO_2$ gas), i.e., the byproduct accompanying the reforming reaction.

However, the reforming reaction in the reforming unit is an endothermic reaction where a reaction temperature is maintained at 250□ to 350 □. On the other hand, the reforming reaction in the CO remover is an exothermic reaction in which a reaction temperature is maintained at 170□ to 200□. Therefore, to attain good reaction efficiency, the RHFC method necessitates an intricate high-temperature system, thereby complicating a structure of an overall fuel cell device and impeding reduction in manufacturing costs thereof.

Moreover, the RHFC method inevitably entails an additional structure for removing the CO gas or $CO_2$ gas, i.e., the byproduct generated during the reforming reaction. This hinders reduction in an overall volume of the device and in manufacturing costs.

Meanwhile, as a method for generating hydrogen by electrolysis, as shown in FIG. 1, an electrolyte such as sea water is filled in an electrolytic bath 1 of a predetermined size. In the electrolytic bath 1 are immersed an anode electrode 2 formed of magnesium (Mg) more ionizable than hydrogen and a cathode electrode 3 formed of iron (Fe). The anode electrode 2 and the cathode electrode 3 are fixed to the electrolytic bath 1 and a cover 4 having a hydrogen outlet is provided on the electrolytic bath 1.

Here, when current is supplied to the anode electrode 2 and the cathode electrode 3, respectively, magnesium reacts with water according to equations 1, 2 and 3. In turn, magnesium hydroxide is generated in the electrolytic bath 1 to generate hydrogen according to equation 4.

$$Mg \rightarrow Mg^{+2} + 2e^- \qquad \text{equation 1}$$

$$2H_2O \rightarrow 2OH^- + 2H^+ \qquad \text{equation 2}$$

$$2H^+ + 2e^- \rightarrow H_2 \qquad \text{equation 3}$$

$$Mg + 2H_2O \rightarrow Mg(OH)_2 + H_2 \qquad \text{equation 4}$$

Also, the magnesium hydroxide obtained by the equations above remain in the electrolytic bath 1, while the hydrogen is exhausted outward through the hydrogen outlet 5 of the cover 4 to be utilized as a fuel.

However, while the hydrogen is generated by supplying the current to the anode electrode 2 and the cathode electrode 3 immersed in the electrolyte of the electrolytic bath 1, water is gradually consumed to lower a level of the electrolyte of the electrolytic bath 1, thereby reducing a contact area between the electrolyte and the electrodes.

Here, an amount of hydrogen generated in the electrolytic bath 1 is proportional to the contact area between the electrolyte and the electrodes. Thus, a fall in the level of the electrolyte of the electrolytic bath leads to a decrease in the amount of hydrogen generated.

This accordingly requires a sensor (not shown) for measuring the level of the electrolyte consumed in the electrolytic bath and a pump 6 replenishing the electrolytic bath 1 with an electrolyte tantamount to the consumed amount. In consequence, this hinders downsizing of the device and subsequent miniaturization thereof, and also increases manufacturing costs.

SUMMARY OF THE INVENTION

An aspect of the present invention provides a hydrogen generator in which electrodes and an electrolyte maintain a substantially constant contact area therebetween to generate hydrogen constantly and stably.

According to an aspect of the present invention, there is provided a hydrogen generator including: an electrolytic bath having an inner space of a predetermined size; a cover hermetically covering an open top of the electrolytic bath and having at least one hydrogen outlet; a flexible pocket disposed in the electrolytic bath and filled with an electrolyte of a predetermined amount; an electrode part fixed to the cover, and immersed in the electrolyte filled in the flexible pocket to electrolyze the electrolyte upon application of power; and a power supply supplying current to the electrode part.

The flexible pocket may include: a plurality of fixing parts having the electrode part formed of an anode electrode plate and a cathode electrode plate inserted thereinto, and fixed to fixing holes of the cover, respectively; an exit part connected to the hydrogen outlet of the cover; and a flexible part expanding or contracting according to change in capacity of the electrolyte filled in the flexible pocket where the anode electrode plate and the cathode electrode plate are disposed so as to be varied in volume.

The exit part may further include a gas-liquid separation membrane.

The flexible part may be formed in a shape identical to the anode and cathode electrode plates, respectively.

The flexible pocket may include: a plurality of fixing parts having the electrode part formed of an anode electrode plate and a cathode electrode plate inserted thereinto, and fixed to fixing holes of the cover, respectively; and a flexible part expanding or contracting according to change in capacity of the electrolyte filled in the flexible pocket where the anode electrode plate and the cathode electrode plate are disposed so as to be varied in volume, the flexible part allowing hydrogen generated during electrolysis of the electrolyte to be exhausted outward and the electrolyte to remain inside.

The flexible part may be formed in a shape identical to the anode and cathode electrode plates, respectively.

The flexible pocket may have an elastic force enabling the flexible pocket to contract at a rate identical to a consumption rate of the electrolyte when electrolyzed.

A sealer may be provided between the electrolytic bath and the cover.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
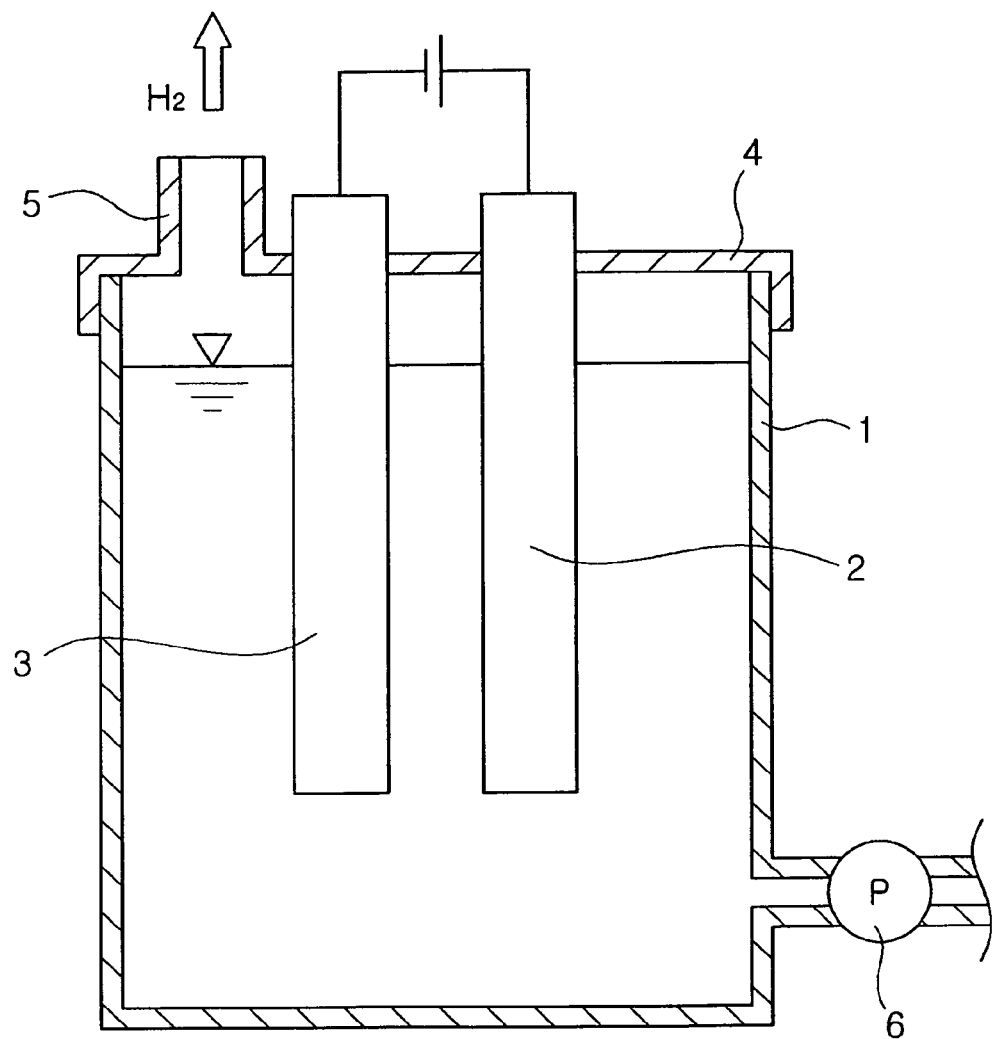
FIG. 1 is a cross-sectional view illustrating a conventional hydrogen generator.
Figure 2:
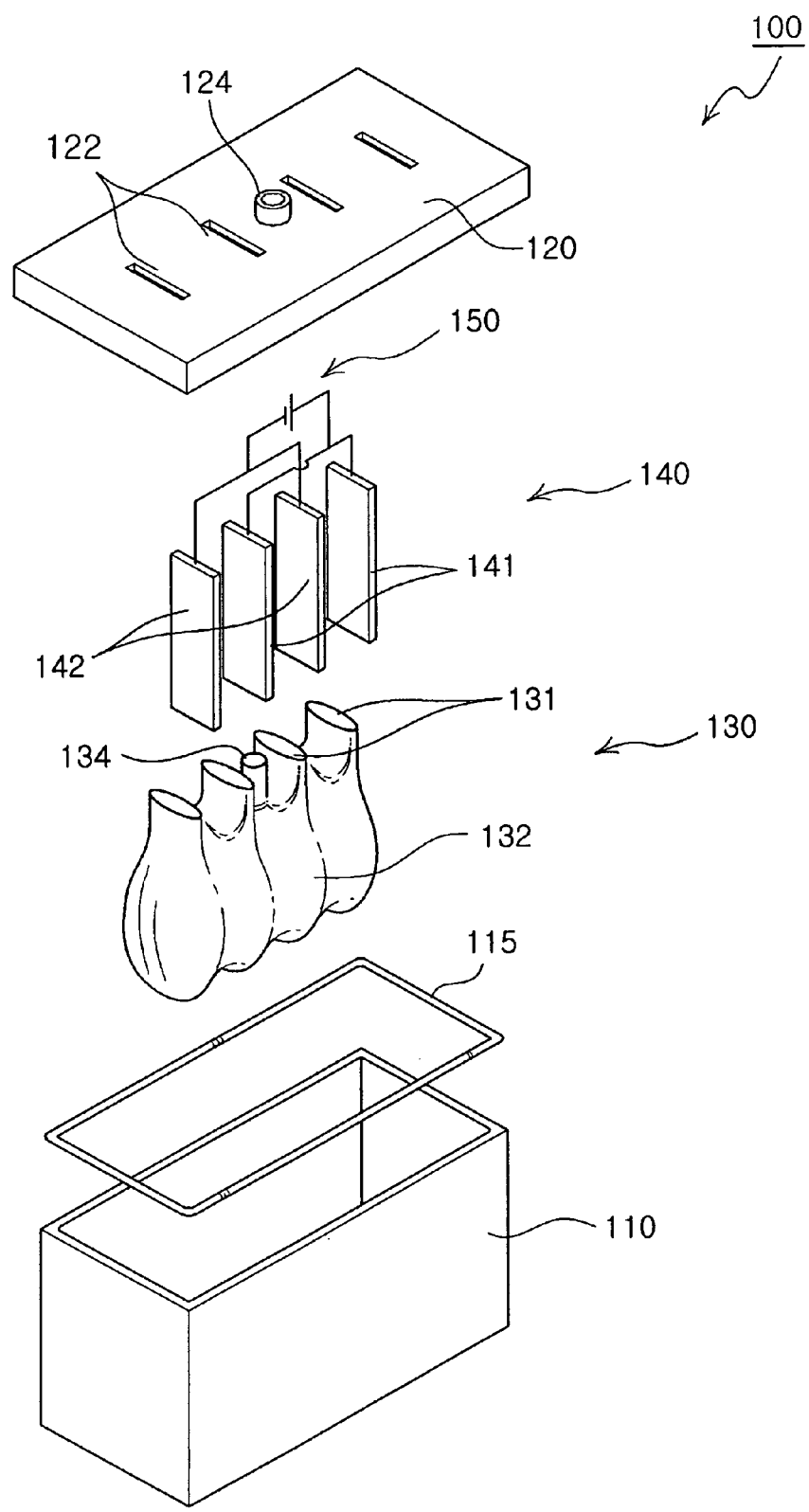
FIG. 2 is an exploded perspective view illustrating a hydrogen generator according to a first embodiment of the invention.
Figure 3A:
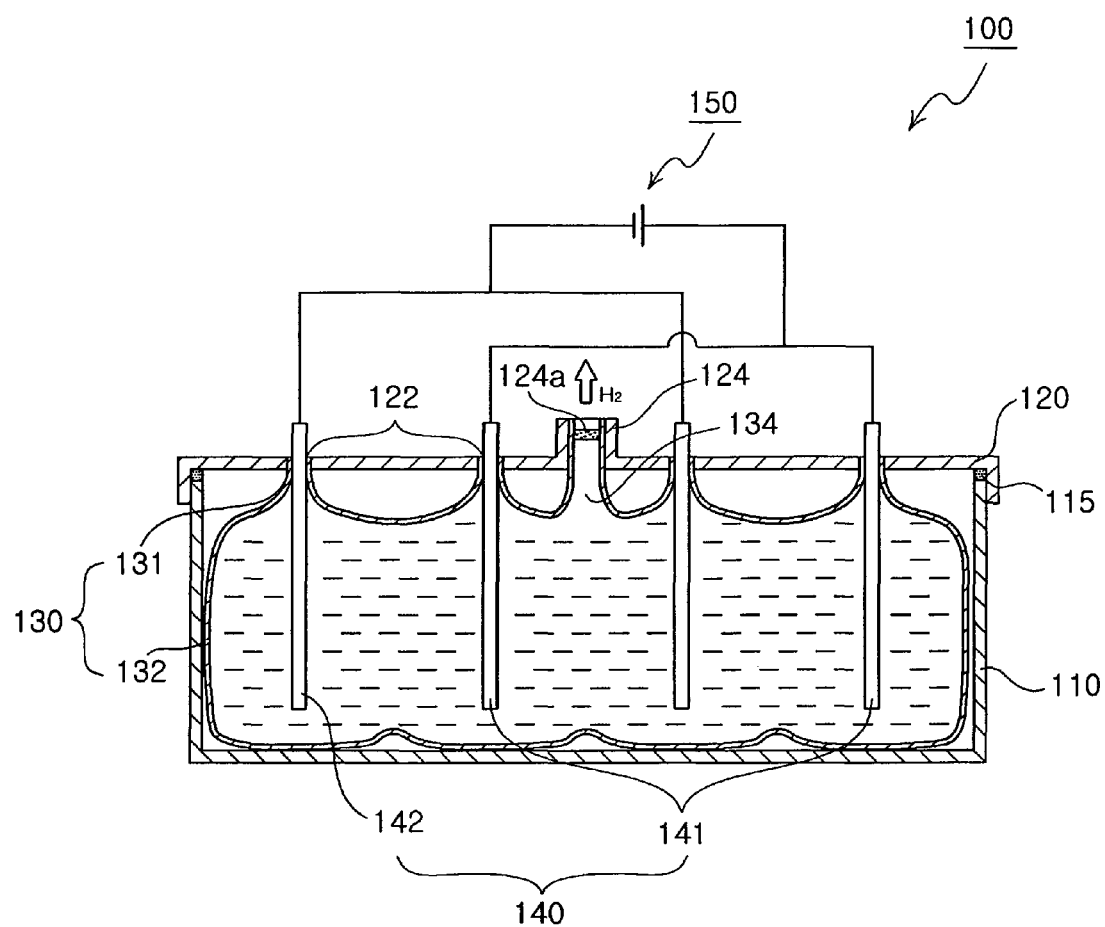
FIG. 3A is a cross-sectional view illustrating an expanded state of a flexible pocket employed in the hydrogen generator of the first embodiment.
Figure 3B:
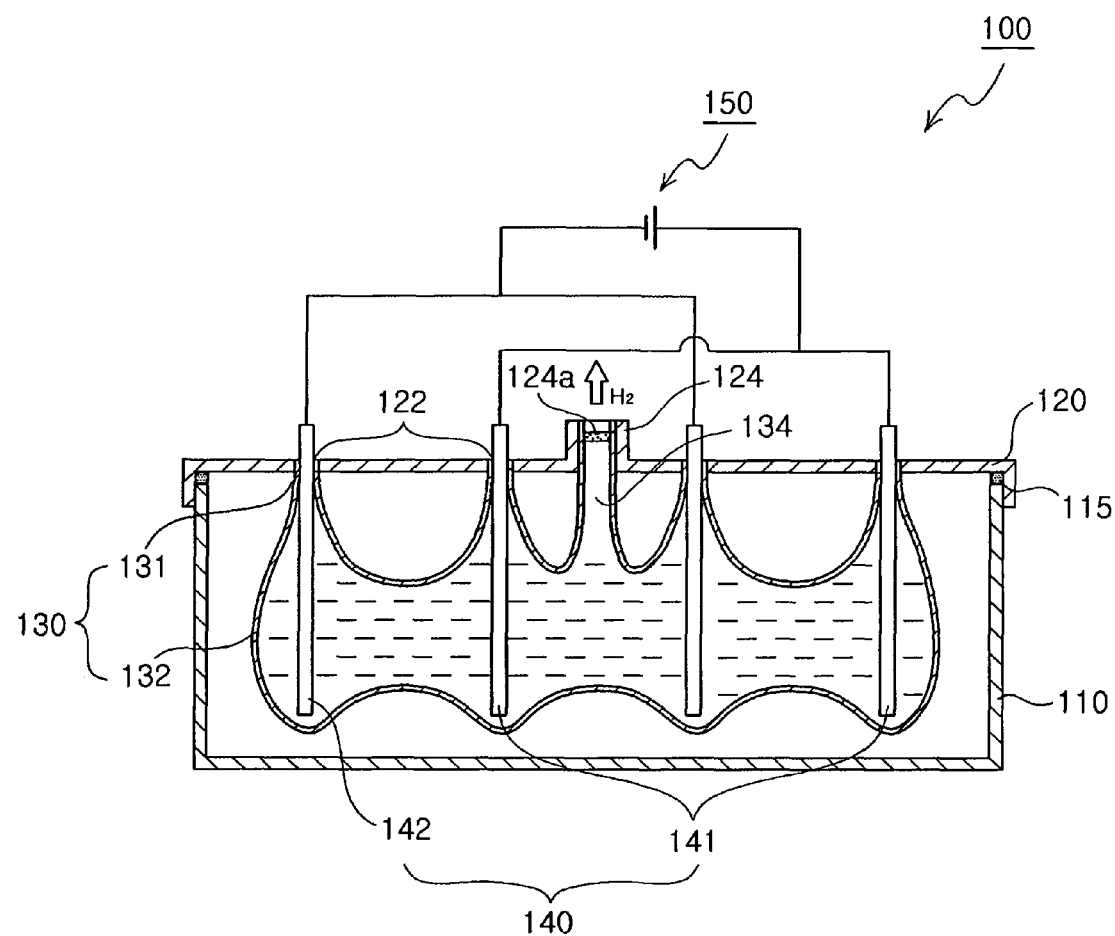
FIG. 3B is a cross-sectional view illustrating a contracted state of a flexible pocket employed in the hydrogen generator of the first embodiment.

FIG. 2 is an exploded perspective view illustrating a hydrogen generator according to a first embodiment of the invention. FIG. 3A is a cross-sectional view illustrating an expanded state of a flexible pocket employed in the hydrogen generator of the first embodiment. FIG. 3B is a cross-sectional view illustrating a contracted state of a flexible pocket employed in the hydrogen generator of the first embodiment.

As shown in FIGS. 2, and 3A and 3B, the hydrogen generator 100 of the first embodiment includes an electrolytic bath 110, a cover 120, a flexible pocket 130, an electrode part 140 and a power supply 150.

The electrolytic bath 110 is formed of a rectangular parallelepiped box having an inner space of a predetermined size. The cover 120 is a plate-shaped structure attached on the electrolytic bath 110 to hermetically cover an open top of the electrolytic bath 110.

A plurality of fixing holes 122 are formed in an outer surface of the cover 120 to fix the electrode part 140 including an anode electrode plate 141 and a cathode electrode plate 142 and a flexible pocket 130.

Also, at least one hydrogen outlet 124 is formed in the outer surface of the cover 120 to exhaust hydrogen generated inside the flexible pocket 130 outward.

Here, the hydrogen outlet 124 is connected to an exit part 134 formed in the flexible pocket 130 to exhaust the hydrogen generated inside the flexible pocket 130 outward through the hydrogen outlet 124.

A sealer 115 made of e.g., a rubber material is provided between an upper end of the electrolytic bath 110 and the cover 120 to shield an interior of the electrolytic bath 110 from external environment.

The flexible pocket 130 where the electrode part 140 is inserted is fixed to the cover 120. Then, the flexible pocket 130 is filled with an electrolyte of a predetermined amount and disposed in the inner space of the electrolytic bath 110.

The flexible pocket 130 includes fixing parts 131, the exit part 134 and a flexible part 132. The fixing parts 131 have the anode electrode plate 141 and the cathode electrode plate 142 of the electrode part 140 inserted thereinto and are fixed to the fixing holes 122 of the cover 120, respectively.

The exit part 134 is connected to the hydrogen outlet 124 formed in the cover 120 to serve as a path through which the hydrogen is exhausted. The flexible part 132 expands or contracts according to change in capacity of the electrolyte filled in the flexible pocket 130 where the anode electrode plate 141 and the cathode electrode plate 142 are inserted through the fixing parts 131 so as to be varied in volume.

The flexible pocket 130 including the flexible part 132 may be formed of a rubber to have an elastic force enabling the flexible pocket 130 to expand or contract according to change in capacity of the electrolyte filled therein so as to be varied in volume.

Accordingly, when the electrolyte filled in the flexible pocket 130 is diminished, the flexible pocket 130 shrinks in volume, thereby preventing a drop in a level of the electrolyte having the electrode part 140 immersed therein. That is, the electrolyte is maintained constant at an initial level.

In this case, the anode and cathode electrode plates 141 and 142 of the electrode part 140, and the electrolyte of the flexible pocket 130 maintain a substantially constant contact area, i.e., initial contact area therebetween, without experiencing reduction in the contact area by decline in the level of the electrolyte.

Also, a gas-liquid separation membrane 134 is provided at the exit part. 134 where the hydrogen generated in the flexible pocket 130 is exhausted so as to allow a vapor generated inside the flexible pocket 130 to remain in the flexible pocket 130 and only the hydrogen to be exhausted outward.

The gas-liquid separation membrane may be configured as a polytetrafluoroethylene (PTFE) membrane to perform filtering with high efficiency. The PTFE membrane has unique microstructure holes through which the hydrogen passes and particles are filtered.

Moreover, in a case where the electrode part includes the pluralities of anode and cathode electrode plates 141 and 142, the flexible part 132 should be integrally joined to another flexible part. The flexible parts 132 having the anode and cathode electrode plates 141 and 142 inserted therein may be formed in a shape substantially identical to the anode and cathode electrode plates 141 and 142, respectively.

The electrode part 140 secured to the fixing parts 131 of the flexible pocket 130 is fixed to the fixing holes 122 of the cover 120. The electrode part 140 has most portions immersed in the electrolyte filled in the flexible pocket 130.

The electrode part 140 includes the anode electrode plate 141 electrically connected to an anode terminal of the power supply 150 and a cathode electrode plate 142 electrically connected to a cathode terminal of the power supply 150.

The power supply 150 is electrically connected to the anode electrode plate 141 and the cathode electrode plate 142 constituting the electrode part 140 to supply current of a predetermined intensity to the anode and cathode electrode plates 141 and 142, respectively.

Figure 4:
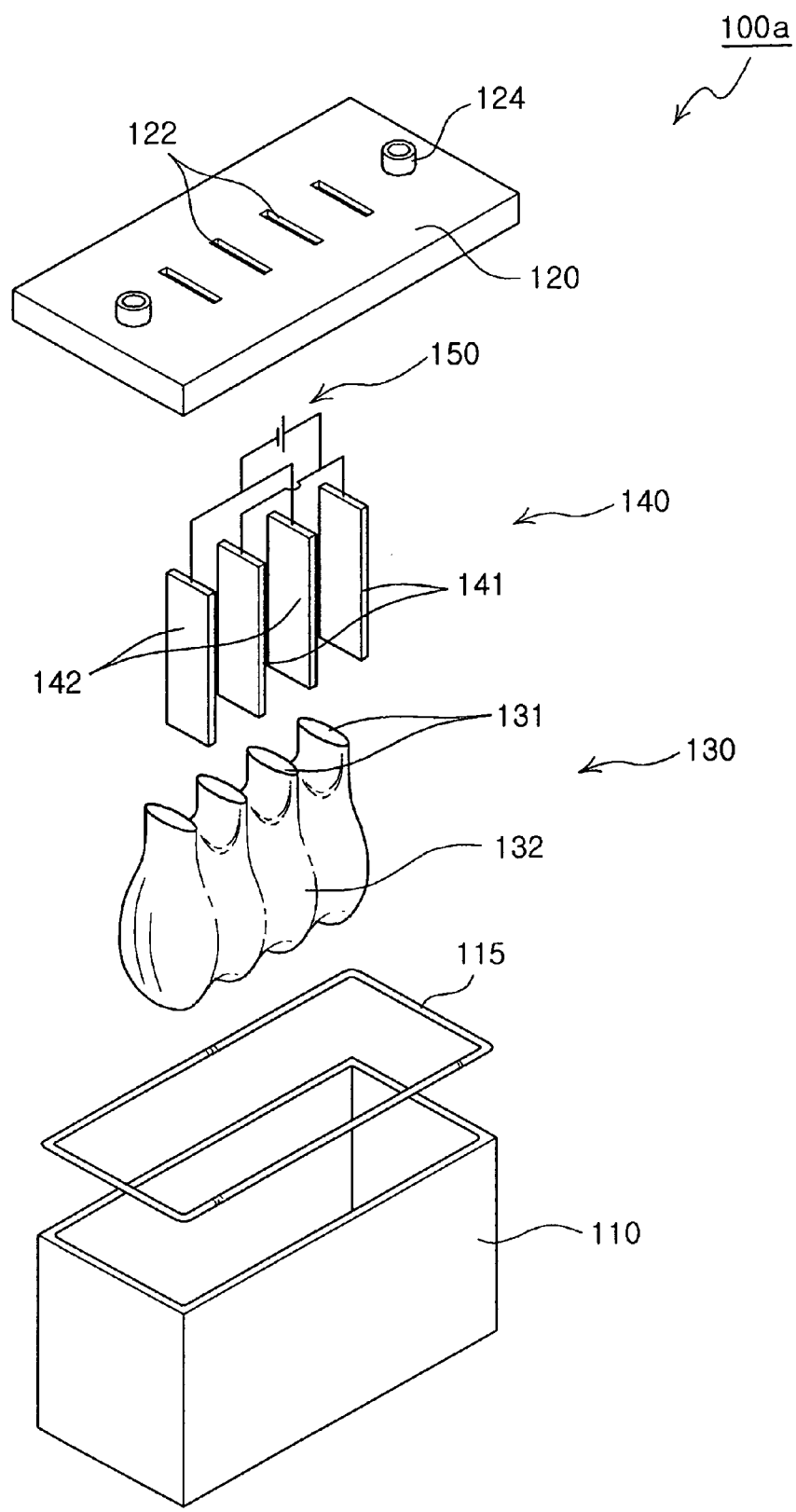
FIG. 4 is an exploded perspective view illustrating a hydrogen generator according to a second embodiment of the invention.
Figure 5A:
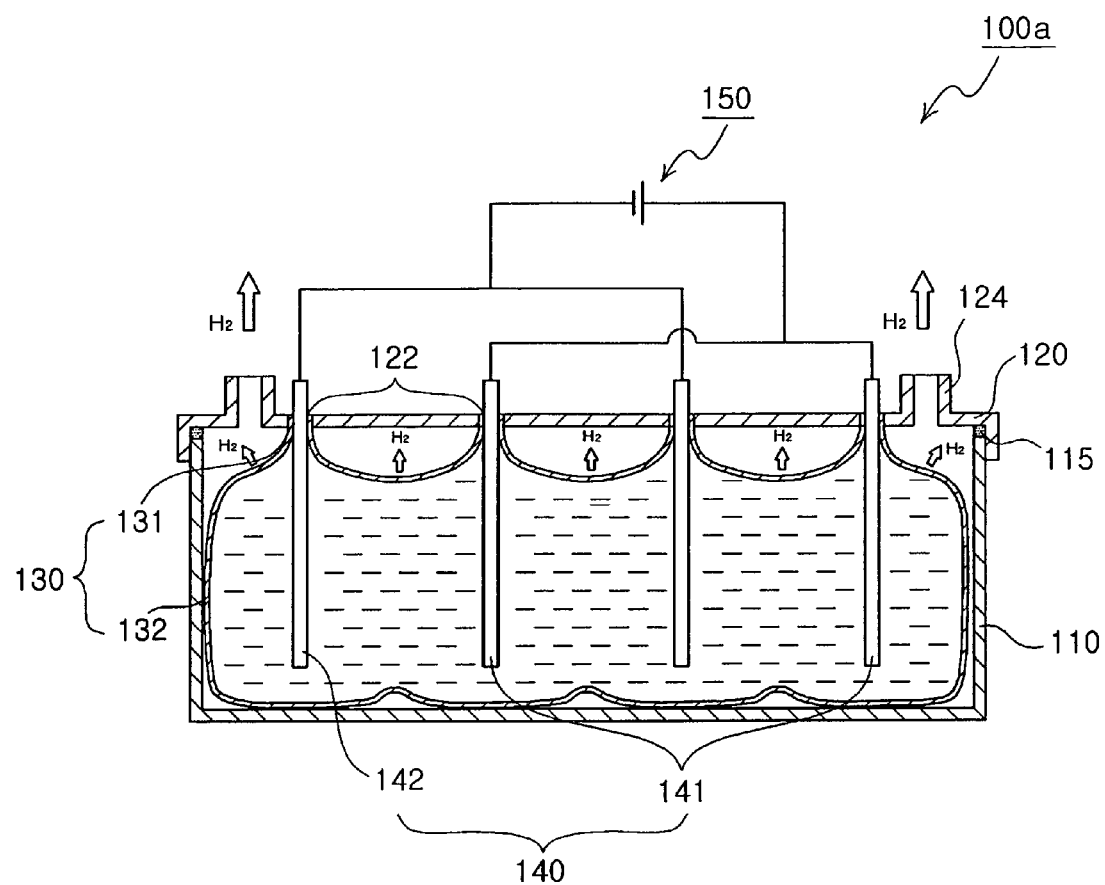
FIG. 5A is a cross-sectional view illustrating an expanded state of a flexible pocket employed in the hydrogen generator of the second embodiment.

FIG. 4 is an exploded perspective view illustrating a hydrogen generator according to a second embodiment of the invention. FIG. 5A is a cross-sectional view illustrating an expanded state of a flexible pocket employed in the hydrogen generator of the second embodiment, and FIG. 5B is a cross-sectional view illustrating a contracted state of the flexible pocket employed in the hydrogen generator of the second embodiment.

Figure 5B:
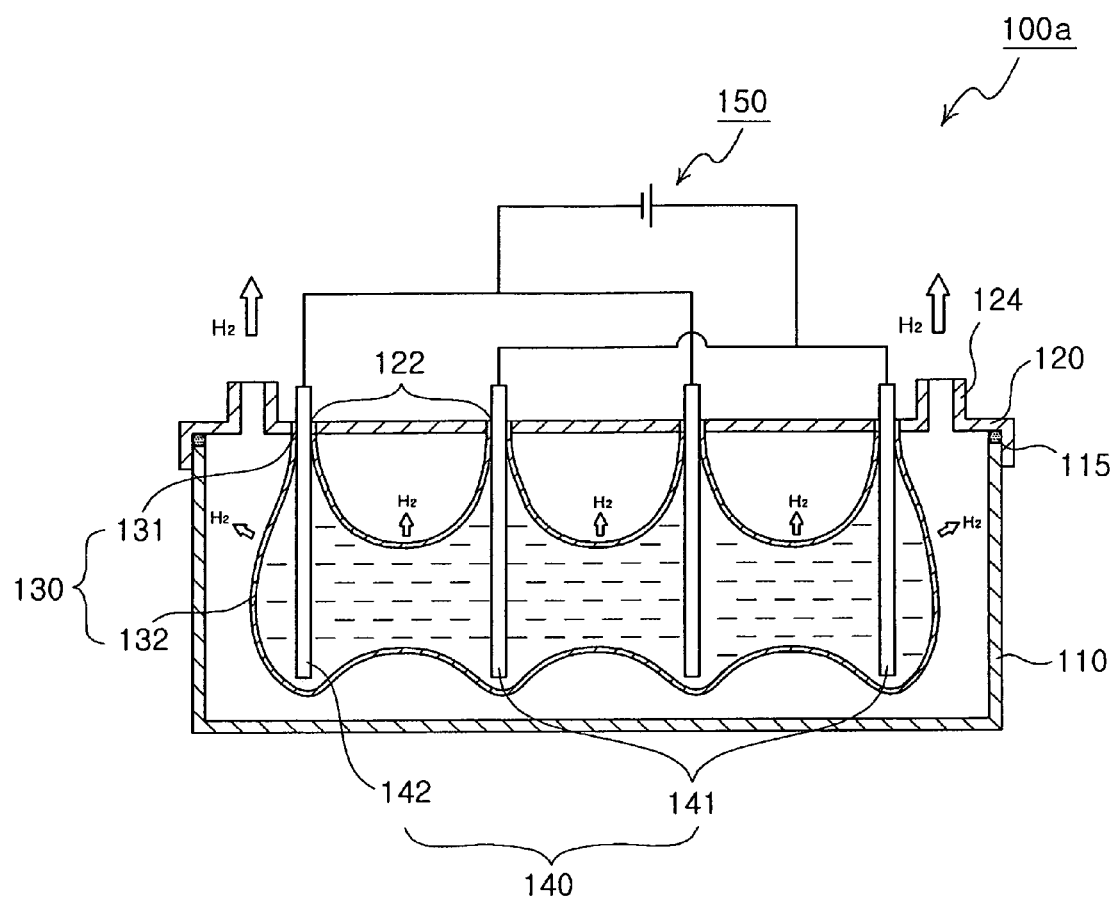
FIG. 5B is a cross-sectional view illustrating a contracted state of the flexible pocket employed in the hydrogen generator of the second embodiment.

As shown in FIG. 4 and FIGS. 5A and 5B, in the same manner as the first embodiment, the hydrogen generator 100a of the second embodiment includes an electrolytic bath 110, a cover 120, a flexible pocket 130, an electrode part 140 and a power supply 150, and like components are designated by like numerals.

The electrolytic bath 110 is formed of a box having an inner space of a predetermined size. The cover 120 hermetically covers an open top of the electrolytic bath 110 and has a plurality of fixing holes 122 formed therein.

Also, at least one hydrogen outlet 124 is formed in an outer surface of the cover 120 to exhaust hydrogen generated inside the flexible pocket 130 and then passed through the flexible pocket 130 outward.

The flexible pocket 130 where the electrode part 140 is inserted is fixed to the cover 120. Then, the flexible pocket 130 is filled with an electrolyte of a predetermined amount and disposed in the inner space of the electrolytic bath 110.

The flexible pocket 130 has an elastic force enabling the flexible pocket 130 to expand or contract according to change in capacity of the electrolyte filled therein so as to be varied in volume. The flexible pocket 130 includes a gas-liquid separation membrane which allows only hydrogen generated during electrolysis to be exhausted outward and the electrolyte to remain inside.

The gas-liquid separation membrane may be configured as a polytetrafluoroethylene (PTFE) membrane to perform filtering with high efficiency. The PTFE membrane has unique microstructure holes through which hydrogen passes and particles are filtered.

Accordingly, when the electrolyte filled in the flexible pocket 130 is diminished, the flexible pocket 130 shrinks in volume, thereby preventing a drop in a level of the electrolyte having the electrode part 140 immersed therein. That is, the electrolyte is maintained constant at an initial level.

In this case, the anode and cathode electrode plates 141 and 142 of the electrode part 140, and the electrolyte of the flexible pocket 130 maintain a substantially constant contact area, i.e., initial contact area therebetween, without experiencing reduction in the contact area by decline in the level of the electrolyte.

The flexible pocket 130 includes fixing parts 131 having the anode electrode plate 141 and the cathode electrode plate 142 of the electrode part 140 inserted thereinto and fixed to the fixing holes 122 of the cover 120, respectively, and a flexible part 132 where the anode electrode plate 141 and the cathode electrode plate 142 inserted through the fixing parts 131 are disposed.

A sealer 115 made of e.g., a rubber material is provided between an upper end of the electrolytic bath 110 and the cover 120 to prevent the hydrogen of the electrolytic bath 110 from being leaked to the outside.

The electrode part 140 has most portions immersed in the electrolyte of the flexible pocket 130. The electrode part 140 includes the anode electrode plate 141 electrically connected to an anode terminal of the power supply 150 and the cathode electrode plate 142 electrically connected to a cathode terminal of the power supply 150.

The power supply 150 is electrically connected to the anode electrode plate 141 and the cathode electrode plate 142 constituting the electrode part 140 to supply current of a predetermined intensity to the anode and cathode electrode plates 141 and 142, respectively.

In the hydrogen generator 100 and 100a configured as above, the flexible pocket 130 having the anode and cathode electrode plates 141 and 142 of the electrode part 140 inserted thereinto is fixed to the fixing holes 122 of the cover 120 assembled with the electrolytic bath 110.

Furthermore, as shown in FIGS. 3A and 3B and FIGS. 5A and 5B, with the fixing parts 131 of the flexible pocket 130 secured to the fixing holes 122 of the cover 120, the flexible part 132 of the flexible pocket 130 is expanded by the electrolyte such as sea water filled therein and the expanded flexible part 132 has an outer surface in contact with an inner surface of the electrolytic bath 110.

Also, the anode electrode plate 141 and the cathode electrode plate 142 of the electrode part 130 are immersed in the electrolyte of the flexible pocket 130.

In this state, when a switch (not shown) of the power supply 150 electrically connected to the electrode part 140 is turned "on", current of a predetermined intensity is supplied to the anode electrode plate 141 and cathode electrode plate 142 of electrode part 140, respectively to electrolyze the electrolyte of the flexible pocket 130, thereby generating hydrogen.

Here, as shown in FIG. 2 and FIGS. 3A and 3B, the flexible pocket 130 is provided with the exit part 134 in communication with the hydrogen outlet 124 of the cover 120. Thus, in a case where the flexible pocket 130 is formed of an elastic material having a volume varied according to change in capacity of the electrolyte, the hydrogen generated inside the flexible pocket 130 is exhausted outward through the exit part 134.

The exit part 134 includes the gas-liquid separation membrane for removing foreign materials from the hydrogen exhausted outward through the exit part.

As shown in FIGS. 4 and FIGS. 5A and 5B, when the flexible pocket has an elastic force enabling the flexible pocket to be varied in volume according to change in capacity of the electrolyte and includes the gas-liquid separation membrane, the hydrogen generated in the electrolyte of the flexible pocket 130 is exhausted inside the electrolytic bath 110 through flexible pocket 130, while the liquid-phase electrolyte remains inside the flexible pocket 130.

Here, an open top of the electrolytic bath 110 is hermetically covered by the cover 120 and a sealer 115 is provided between an upper end of the electrolytic bath 110 and the cover 120 so as to fundamentally prevent outward leakage of the gas-state hydrogen exhausted through the flexible pocket 130 including the gas-liquid separation membrane during electrolysis of the electrolyte. The hydrogen exhausted through the flexible pocket 130 may be exhausted through the hydrogen outlet 124, without leakage.

That is, in a case where the anode electrode plate 141 is formed of magnesium (Mg) more ionizable than hydrogen, and the cathode electrode plate 142 is formed of iron (Fe), when current is supplied to the anode electrode plate 141 and the cathode electrode plate 142, respectively, the magnesium of the anode electrode plate 141 reacts with water in the electrolyte according to equations 1, 2 and 3, and then magnesium hydroxide is generated in the flexible pocket 130 to generate hydrogen according to equation 4.

Subsequently, when the electrolyte of the flexible pocket 130 is successively electrolyzed, the electrolyte is gradually consumed and reduced in overall amount. However, as shown in FIGS. 3A and 3B and FIGS. 5A and 5B, with decrease in an overall volume of the electrolyte, the flexible pocket 130 formed of an elastic material naturally contracts to a smaller volume. This accordingly prevents a fall in the level of the electrolyte filled in the flexible pocket 130. That is, the electrolyte maintains an initial level.

Here, when the electrolyte of the flexible pocket 130 is consumed by electrolysis at a rate identical to a contraction rate of the flexible pocket 130, the electrolyte of the flexible pocket 130 maintains an initial level. Accordingly, the flexible pocket 130 may be formed of a material having an elastic force enabling the flexible pocket to contract at a rate identical to a consumption rate of the electrolyte when electrolyzed.

In this case, the anode electrode plate 141 and the cathode electrode plate 142 of the electrode part 140 react with the electrolyte of the flexible pocket 130, with a substantially constant contact area therebetween during electrolysis of the electrolyte. This enables hydrogen to be generated constantly and stably per a predetermined time without a need for sensing change in the level of the electrolyte frequently and replenishing the electrolytic bath 110 with the electrolyte via an additional pump.

Then, the hydrogen exhausted from the flexible pocket 130 is exhausted outward through the hydrogen outlet 124 formed in the cover 120 and the hydrogen exhausted outward is supplied to a power generator of a fuel cell to generate electricity.

That is, the hydrogen is supplied to an anode through an anode separation plate provided in the generator, and an air containing oxygen is supplied to a cathode through a cathode separation plate provided in the generator.

As described above, the hydrogen and air supplied to the generator flow, with a polyelectrolyte membrane interposed therebetween. In the anode, the hydrogen is electrochemically oxidized according to equation 5 below and in the cathode, the oxygen is electrochemically reduced according to equation 6 below.

Here, electricity is generated due to migration of electrons created. The generated electricity is collected on anode and cathode collection plates to be utilized as an energy source.

Anode electrode reaction : $H_2 \to 2H^+ + 2e^-$ equation 5

Cathode electrode reaction : $(\frac{1}{2})O_2 + 2H^+ + 2e^- \to H_2O$ equation 6

As set forth above, according to exemplary embodiments of the invention, an anode electrode plate and a cathode electrode plate are disposed inside a flexible pocket filled with electrolyte to be immersed in the electrolyte. Accordingly, the flexible pocket can contract as much as the electrolyte is consumed when electrolyzed, thereby allowing the electrolyte to maintain an initial level constantly. This as a result allows the electrolyte to react with the electrode plates, with a constant contact area therebetween, without a need for replenishing an electrolyte from the outside via an additional pump. This ensures hydrogen to be generated stably and constantly per a predetermined time.

In addition, the hydrogen generator is less bulky and more compact, and can be handled and used conveniently, thereby applicable to a fuel cell such as a mobile terminal, an electronic notebook, a personal digital assistant (PDA), a portable multimedia player (PMP), an MPEG audio layer-III (MP3) player and a navigation.

While the present invention has been shown and described in connection with the exemplary embodiments, it will be apparent to those skilled in the art that modifications and variations can be made without departing from the spirit and scope of the invention as defined by the appended claims.

What is claimed is:

1. A hydrogen generator comprising:
    an electrolytic bath having an inner space of a predetermined size;
    a cover hermetically covering an open top of the electrolytic bath and having at least one hydrogen outlet;
    a flexible pocket disposed in the electrolytic bath and filled with an electrolyte of a predetermined amount;
    an electrode part fixed to the cover, and immersed in the electrolyte filled in the flexible pocket to electrolyze the electrolyte upon application of power; and
    a power supply supplying current to the electrode part,
    wherein the flexible pocket contracts in a thickness direction of the electrode part according to a reduction of a capacity of the electrolyte filled in the flexible pocket to maintain a certain range of a length of the electrode part, which is immersed in the electrolyte, and the flexible pocket is made of a gas-liquid separation membrane which exhausts only the hydrogen outwardly.

2. The hydrogen generator of claim 1, wherein the flexible pocket comprises:
    a plurality of fixing parts having the electrode part formed of an anode electrode plate and a cathode electrode plate inserted thereinto, and fixed to fixing holes of the cover, respectively;
    an exit part connected to the hydrogen outlet of the cover; and
    a flexible part contracting according to reduction in capacity of the electrolyte filled in the flexible pocket where the anode electrode plate and the cathode electrode plate are disposed so as to be varied in volume.

3. The hydrogen generator of claim 2, wherein the flexible part is formed in a shape identical to the anode and cathode electrode plates, respectively.

4. The hydrogen generator of claim 1, wherein the flexible part is formed in a shape identical to the anode and cathode electrode plates, respectively.

5. The hydrogen generator of claim 1, wherein the flexible pocket has an elastic force enabling the flexible pocket to contract at a rate identical to a consumption rate of the electrolyte when electrolyzed.

6. The hydrogen generator of claim 1, wherein a sealer is provided between the electrolytic bath and the cover.

7. The hydrogen generator of claim 1, wherein the thickness direction of the electrode part is a direction perpendicular is a direction perpendicular to an elongated surface of the electrode part.

8. The hydrogen generator of claim 1, wherein the flexible pocket contracts in a direction perpendicular to the thickness direction of the electrode part according to a reduction of a capacity of the electrolyte filled in the flexible pocket.

* * * * *